United States Patent [19]
Louderback et al.

[11] Patent Number: 5,885,513
[45] Date of Patent: Mar. 23, 1999

[54] RESIN INFUSION METHOD

[75] Inventors: Michael J. Louderback, Torrance, Calif.; Robert W. Friedrich, Hochdorf, Switzerland

[73] Assignee: Northrop Grumman Corporation, Los Angeles, Calif.

[21] Appl. No.: 823,065

[22] Filed: Mar. 31, 1997

[51] Int. Cl.$^6$ ................................... B29C 45/14
[52] U.S. Cl. .................. 264/459; 264/478; 264/496; 264/510; 264/257; 264/271.1; 264/273; 264/279; 264/279.1; 264/327; 425/129.1; 425/174
[58] Field of Search ............................ 264/459, 478, 264/496, 510, 327, 257, 273, 279, 279.1; 425/174, 129.1

[56] References Cited

U.S. PATENT DOCUMENTS

| | | | |
|---|---|---|---|
| 3,526,694 | 9/1970 | Lemelson | 264/327 |
| 4,560,523 | 12/1985 | Plumley et al. | 264/102 |
| 4,780,262 | 10/1988 | Von Volkli | 264/512 |
| 5,008,049 | 4/1991 | Rose et al. | 264/4 |
| 5,035,602 | 7/1991 | Johnson | 425/468 |
| 5,169,571 | 12/1992 | Buckley | 264/22 |
| 5,215,322 | 6/1993 | Enders | 280/231 |
| 5,275,372 | 1/1994 | Boeckeler | 249/134 |
| 5,281,388 | 1/1994 | Palmer et al. | 264/571 |
| 5,407,610 | 4/1995 | Kohama et al. | 264/22 |
| 5,665,301 | 9/1997 | Alanko | 264/571 |

*Primary Examiner*—Jan H. Silbaugh
*Assistant Examiner*—Stefan Staicovici
*Attorney, Agent, or Firm*—Terry J. Anderson; Karl J. Hoch, Jr.

[57] ABSTRACT

Method and apparatus of making a reinforced composite structure wherein a reusable mold closure is mated to a mold to close off a mold cavity in which a reinforcement is positioned. The mold closure or mold includes a plurality of collapsible resin supply ports through which resin is pumped into the mold cavity from a source of resin to infuse or impregnate the reinforcement with resin. After the resin is introduced into the mold cavity, the resin residing in the resin supply ports is selectively cured to form respective cured resin plugs on which the resin supply ports collapse to seal them in air-tight manner. The resin residing in the mold and infused in the reinforcement is not cured at that time. Instead, after the cured resin plugs are formed at the resin supply ports, the assembly of mold and mold closure with the resin infused reinforcement therein can be moved to a curing station, such as a curing oven, where the resin infused in the reinforcement is cured under vacuum in the mold in a separate readily controlled curing operation.

17 Claims, 7 Drawing Sheets

RESIN INFUSION METHOD

FIELD OF THE INVENTION

The present invention relates to manufacture of reinforced composite structures wherein a liquid resin is infused through a reinforcement positioned in a mold and cured or hardened to form the composite structure.

BACKGROUND OF THE INVENTION

In the manufacture of large size fiber reinforced composite structures, such as those used in aerospace and vehicle (e.g. bus) structures, a dry reinforcement, such as a sandwich of foam between plies or layers of glass fiber, is laid up in a female mold and an infusion medium is carefully aligned and placed on the reinforcement to facilitate infusion of chemically catalyzed liquid resin evenly across and through the reinforcement. The infusion medium includes a peel ply adjacent the reinforcement to prevent sticking to the resin infused reinforcement.

A flexible, gas impermeable bag is placed around the entire female mold, and a relative vacuum is drawn in the bag to a degree that ambient pressure external of the bag compresses the reinforcement in a manner to substantially reduce its cross-sectional thickness. A chemically catalyzed resin is pumped into the "bagged" mold through numerous individual resin supply lines or conduits. A large number of resin supply lines is necessary to insure distribution of the resin through the reinforcement before the resin cures or hardens in-situ by virtue of the chemical catalyst present. When resin curing or hardening is completed in the female mold, the flexible bag, the infusion medium, and resin supply lines all must be removed and disposed of in an environmentally acceptable manner.

Although the resin infusion method described above produces high-quality reinforced composite structures, it is disadvantageous in that excess resin waste is produced. In particular, since the resin cannot be removed from the resin supply lines before the resin cures or hardens in the mold, both the resin supply lines and resin in the lines must be destroyed or disposed of as hazardous waste. Moreover, curing or hardening of the chemically catalyzed resin in the mold may occur prematurely, resulting in a lack of repeatability of one composite structure to the next. The infusion method described above is further disadvantageous in that intensive manual touch labor is needed from lay-up of the reinforcement and infusion medium in the female mold and their careful alignment prior to injection of resin followed by removal of the flexible bag, infusion medium and resin supply lines after resin injection and curing or hardening. This manual labor increases cycle time and cost to manufacture reinforced composite structures.

An object of the present invention is to provide a resin infusion method and apparatus that overcome these aforementioned problems and disadvantages.

SUMMARY OF THE INVENTION

The present invention provides method and apparatus for making a reinforced composite structure wherein resin is introduced through a plurality of resin supply ports into a mold to infuse a reinforcement therein with the resin. After the reinforcement is infused with resin, resin at the resin supply ports is selectively cured to form cured resin plugs while avoiding curing of the resin in the mold. The resin supply ports cooperate with the cured resin plugs to provide air-tight seals at the ports. After the resin supply ports are air-tight sealed, the resin source is disconnected from the resin supply ports typically by releasing a connection between the resin supply ports and a resin supply tube. Then, the resin infused in the reinforcement is cured in the mold under controlled curing conditions. Preferably, the assembly of the mold and mold closure with the resin infused reinforcement therein is moved to an automatic curing station with controlled curing conditions to form under vacuum in the mold a reinforced composite structure in the mold. When curing of the reinforced composite structure is complete, the mold vacuum is released, and the mold closure can be readily separated from the mold and reused in the manufacture of additional reinforced composite structures.

In one embodiment of the present invention, a reusable mold closure is mated to the mold to close off a mold cavity in which the reinforcement is positioned. The mold closure includes a plurality of collapsible resin supply ports through which resin is introduced into the mold cavity to infuse or impregnate the reinforcement with resin. After the reinforcement is infused with resin in the mold, the resin residing in the resin supply ports is selectively cured to form respective solid cured resin plugs on which the resin supply ports are collapsed by differential pressure to seal the ports in air-tight manner. In particular, each air-tight seal is formed by collapsing each resin supply port or a component thereof by differential pressure action (i.e. ambient pressure external of the ports and relative vacuum internal of the ports) onto the cured resin plugs as the plugs are cured and hardened in-situ at the ports.

In a particular embodiment of the invention, an ultraviolet (UV) and heat curable resin is introduced into the mold cavity. This resin is selectively cured at the resin supply ports to form the solid resin plugs by exposure to ultraviolet radiation from an ultraviolet lamp disposed on the mold closure proximate each port. The mold closure is made of an ultraviolet transmitting material, such as silicone rubber, to this end.

The resin residing in the mold is not cured at the time that the cured resin plugs are formed at the resin supply ports. Instead, after the cured resin plugs are formed at the resin supply ports, the assembly of the mold and mold closure with the resin infused reinforcement therein preferably is moved to a curing station where the resin infused in the reinforcement is cured under vacuum in a controlled curing operation.

A particular embodiment of the present invention communicates each of the resin supply ports to a respective one of resin supply conduits. The resin supply conduits are disposed on the mold closure for movement therewith to the curing station and connected to a central, common resin supply tube by a self-air tight sealing releasable connection. During the selective curing of the resin at the resin supply ports, curing of the resin residing in the resin supply conduits upstream of the cured resin plugs is avoided, whereby the resin in the conduits remains uncured and can be removed from the conduits prior to movement of the mold and mold closure to the curing station. The uncured resin residing in the resin supply conduits is removed by venting the resin supply conduits to ambient atmosphere via respective vent valves disposed proximate the plugs and evacuating the central resin supply tube by a vacuum pump so as to suck the uncured resin from the resin supply conduits to a reservoir for reuse.

The present invention is advantageous in that the reusable mold closure described above is used in lieu of the flexible bag and multi-layered infusion medium heretofore used, thereby reducing the number of components involved and the manual labor associated with inserting and removing these components from the mold cavity. In addition, the air-tight sealing of the resin supply ports by selective curing of the resin at the ports followed by subsequent curing of the resin in the mold under vacuum at a curing station provides much improved control over the curing stage. In particular, resin curing is no longer dependent on a difficult-to-control chemical reaction. Instead, curing of the resin infused in the reinforcement is controlled by separate application of ultraviolet radiation and/or heat at the curing station. This curing regime provides improved repeatability in curing of composite structures as well as improved productivity and production scheduling. Still further, the invention enables reuse of the closure member, the resin in the resin supply conduits, and the resin supply lines themselves, whereas heretofore these were disposed of or destroyed as hazardous material.

The above advantages and objects of the present invention will become more readily apparent from the following detailed description taken with the following drawings.

DESCRIPTION OF THE INVENTION

Referring to FIGS. 1–6, apparatus in accordance with one embodiment of the present invention is illustrated for making a reinforced composite structure. The apparatus is illustrated as comprising a female (or male) mold 10 having an arcuate mold cavity 12 in which an arcuate reinforcement 14 is positioned for infusion or impregnation with a suitable liquid resin. The mold 10 typically is supported on a mold base 11 and is comprised of a metal or composite material (e.g. fiber reinforced plastic) having the mold cavity 12 machined or otherwise formed therein. Although an arcuate mold cavity shape is illustrated, for example, to form a composite structural aerospace or vehicle panel, the mold cavity 12 may have any shape generally complementary to that desired for the reinforced composite structure. Similarly, the reinforcement 14 is illustrated as having an arcuate shape to form an arcuate composite structural aerospace or vehicle panel. However, the reinforcement may have any other shape as required for a particular reinforced composite structure to be manufactured.

Figures 3, 3A:
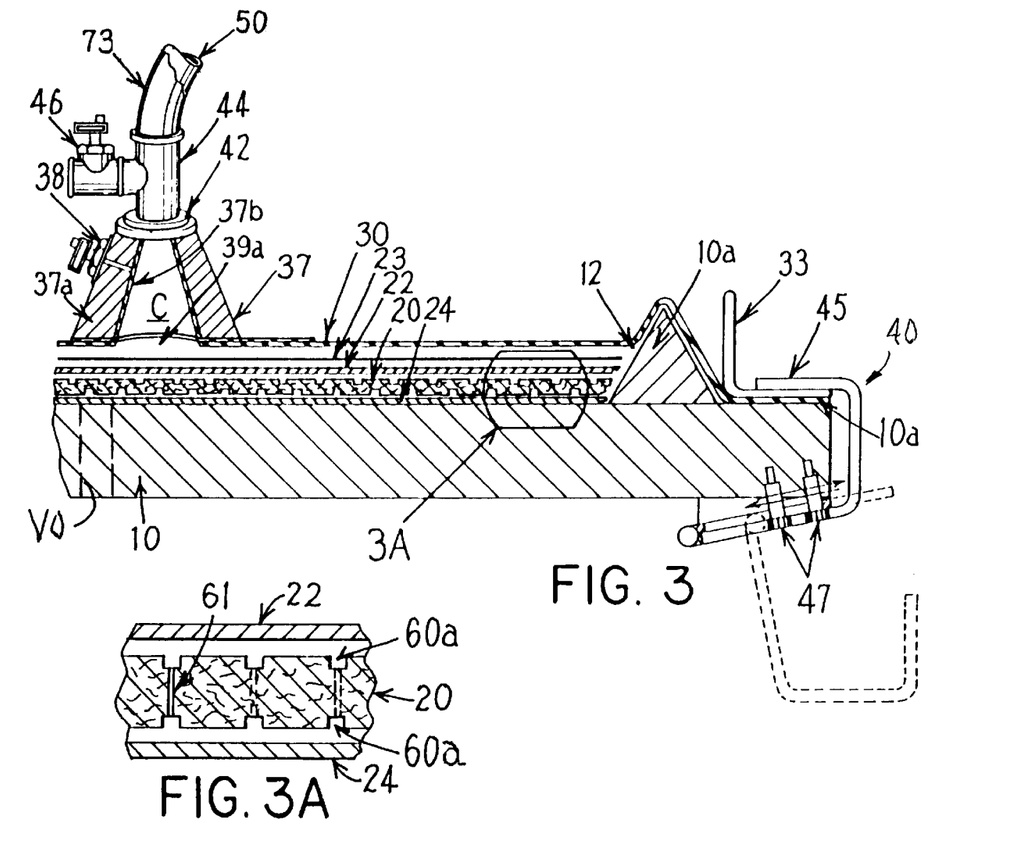
FIG. 3 is a partial cross-sectional view of the mold closure and female mold clamped together with a reinforcement therebetween.
FIG. 3A is an exploded sectional view taken at the region 3A in FIG. 3.
Figure 4:
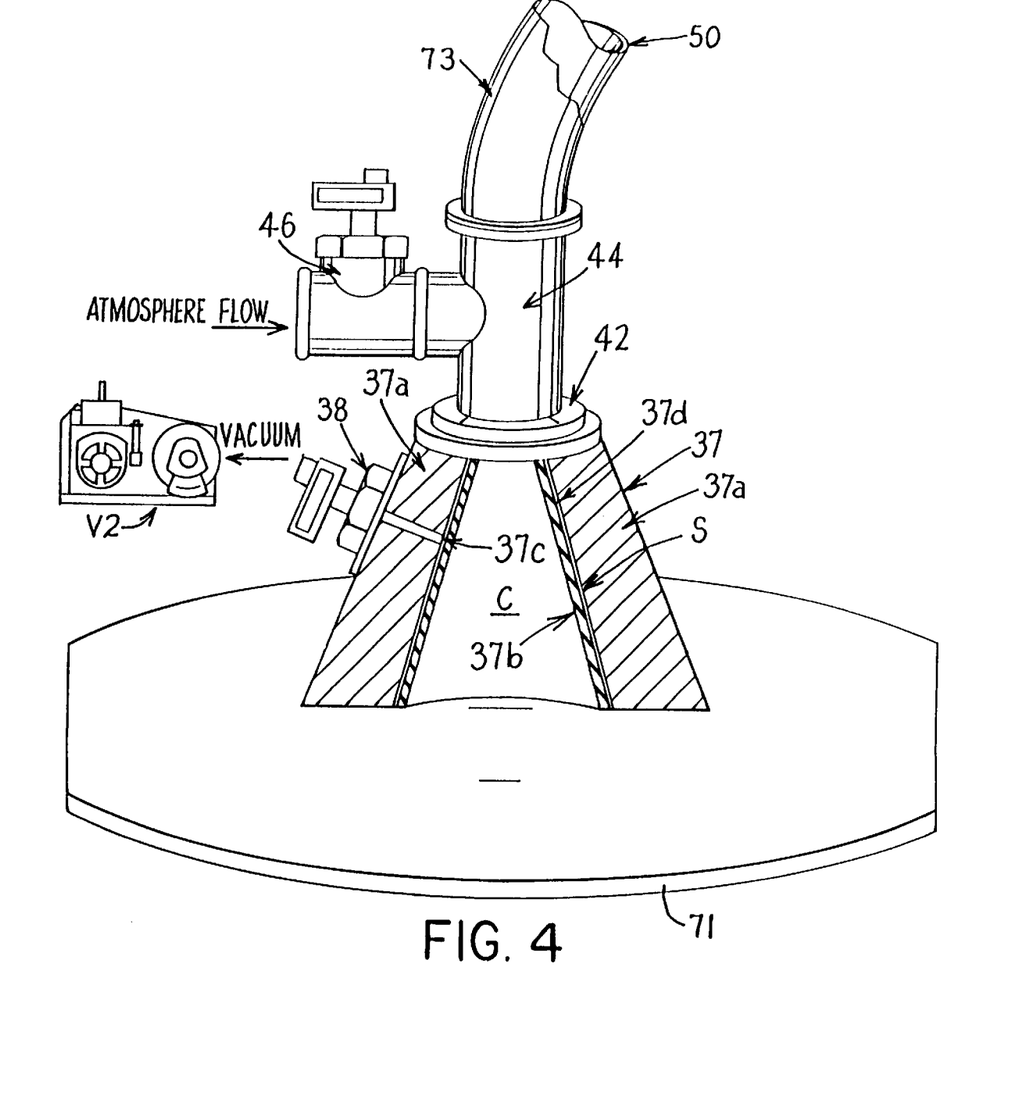
FIG. 4 is an enlarged prespective view of an individual resin supply port partially broken away.

A representative reinforcement comprises a laid-up sandwich of polymeric foam layer 20, such as for example PVC foam, between porous glass fiber plies or layers 22, 24, FIG. 3, permeable to liquid resin. The foam layer 20 may have an initial thickness of ¼ inch to 12 inches, while the glass fiber layers may each have an initial thickness of 0.06 inch to 1.5 inches. An optional Teflon coated porous nylon peel ply 23 permeable to liquid resin may be present on the upper glass fiber layer 22. The invention is not limited to the particular reinforcement and materials illustrated and described and may comprise other reinforcements, such as Kevlar or graphite reinforcement materials.

Figures 1, 1A:
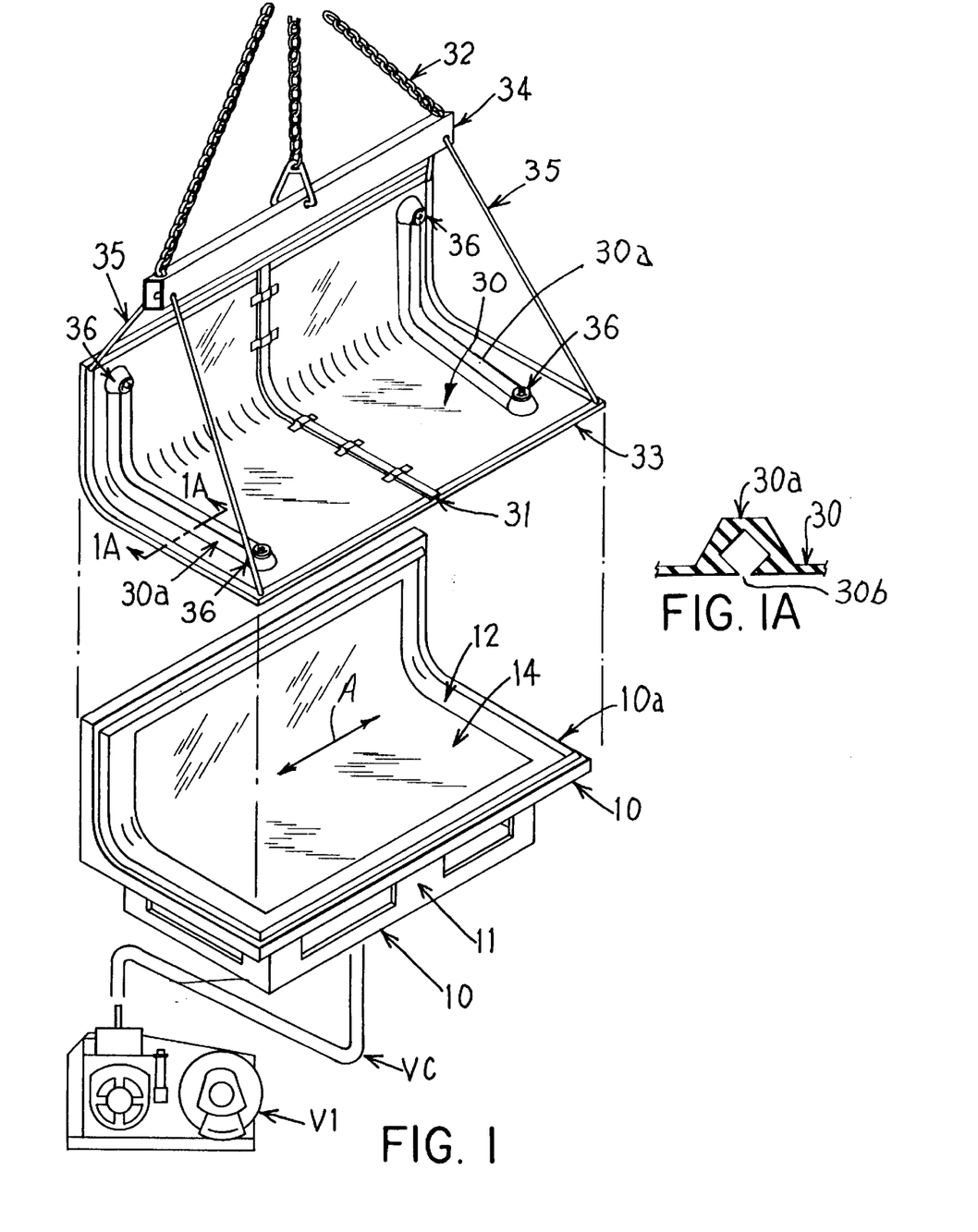
FIG. 1 is an exploded perspective view of apparatus in accordance with one embodiment of the invention.
FIG. 1A is a sectional view taken along lines 1A—1A of FIG. 1.
Figure 2:
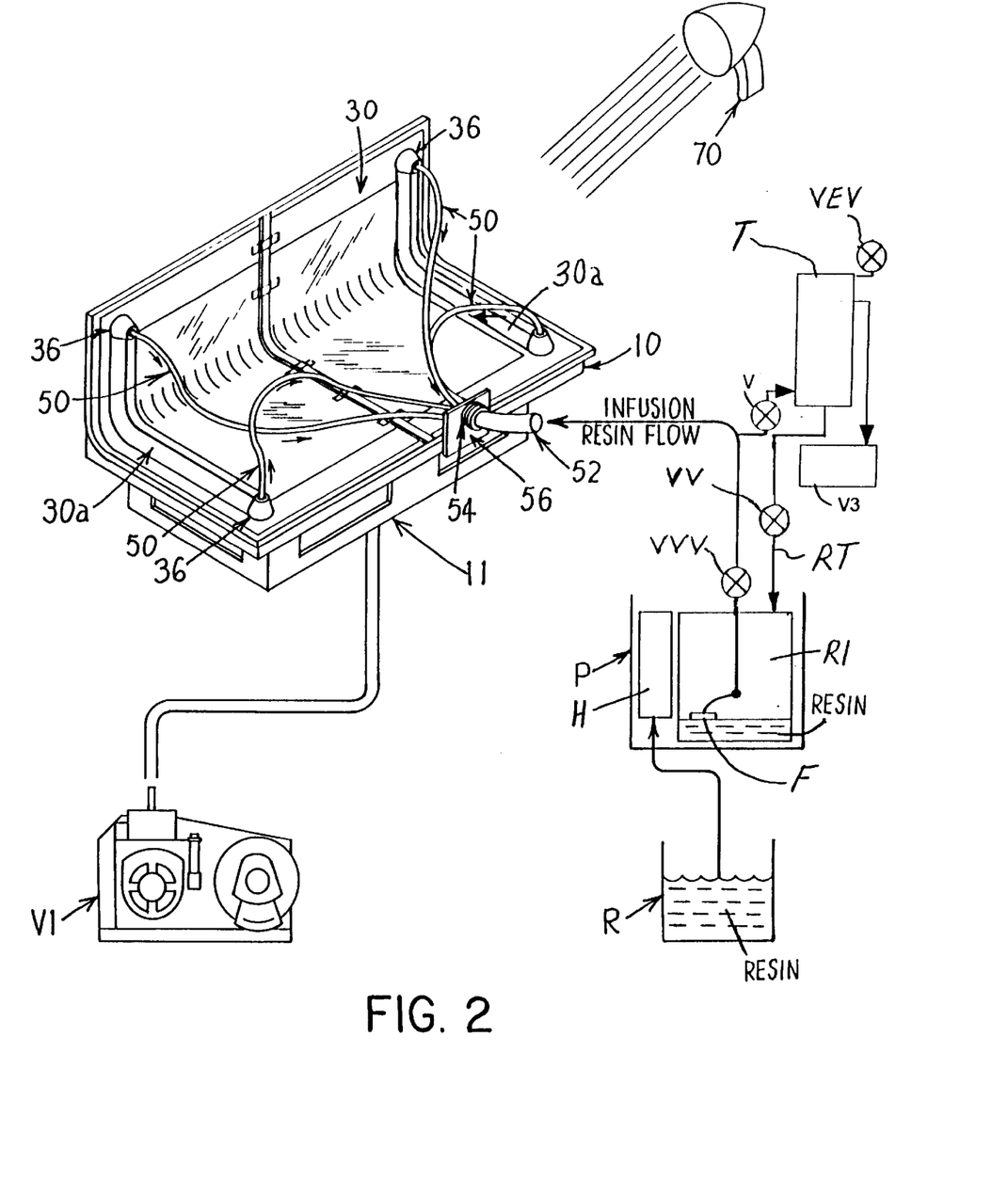
FIG. 2 is a perspective view of the apparatus of FIG. 1 with the mold closure positioned on the female mold.

A reusable gas impermeable mold closure 30 is shown in FIG. 1 being lowered by an overhead pulley system 32 and support bar 34/connectors 35 onto the female mold 10 and reinforcement 14 and in FIG. 2 engaged on the mold 10 and reinforcement 14. The mold closure 30 is releasably and sealably clamped on the periphery 10a of the mold 10 by a clamp or latch mechanism 40 shown in FIG. 3. The mold periphery includes an upstanding delta lock projection 10a that cooperates with the mold closure 30 to define the mold cavity 12 when the closure 30 is thusly clamped on the mold 10 as shown in FIG. 3.

The mold closure 30 typically comprises a flexible member which, for example, may be made of gas impermeable, transluscent silicone rubber sheet having a thickness of 0.125 to 0.250 inch for example only. The silicone rubber mold closure 30 is transparent to ultraviolet radiation. The silicone rubber closure is supported on a frame 31 including L-shaped (or other shape) aluminum frame rails 33 and a central flat rail connected to the silicone rubber with adhesively bonded straps.

The clamp or latch mechanism 40 includes a slide-away brace 45 extending about each of the outer rails 33. Each brace 45 is slotted at locations 24 inches apart to receive fastening pins 47 that are threaded into the mold 10 to thereby fasten the braces 45 in a manner to engage the adjacent rails 33 to effect an air-tight seal between the mold 10 and mold closure 30, FIG. 3. Each brace 45 is released (see dashed line position in FIG. 3) from the associated rail 33 by untightening the pins 47 and sliding the brace 45 outwardly relative to the mold 10 with the pins remaining in the brace slots.

The mold closure 30 includes one or more outer integral channels 30a (two shown in FIG. 1) communicated to ports 36 for resin flow from the ports 36 to channels 30a and having feed grooves 30b as shown in section in FIG. 1A. The channel grooves 30b feed resin from ports 36 to resin distribution passages or grooves 60a in the reinforcement 14, FIG. 3A. The feed groove 30b has a width of ¹⁄₁₆ to ⅛ inch and the channel 30a has a width of ⅛ inch and height of ⅛ inch for example only. The channels 30a can be spaced apart in the longitudinal direction A by 4 to 6 feet for example only depending on the size of the reinforcement. Any number of channels 30a can be provided on the closure 30 and arranged in a pattern suited for the reinforcement being infused with resin.

The passages or grooves 60a are provided in the foam layer 20 of the reinforcement 14 and extend transverse to the channels 30a so as to communicate proximate opposite ends with one or more channels 30a to receive resin from the feed grooves 30b thereof. In FIGS. 1–3, the grooves 60a extend parallel to one another and to the longitudinal axis A of the foam layer 20. The passages or grooves 60a are arranged in a pattern that is part dependent to achieve satisfactory distribution of the resin supply throughout the reinforcement layers 22, 24; i.e. the grooves are arranged in a pattern determined to distribute resin across and throughout the particular reinforcement configuration being infused with resin.

The passages or grooves 60a can be provided in opposite sides of the foam layer 20, FIG. 3A, and extend in longitudinal, transverse and/or other directions to distribute resin to this end. Resin distribution passages or grooves 60a on opposite or different sides of a resin impermeable intermediate foam layer 20 are supplied with resin via interconnecting resin passages or conduits 61, such as holes of ¼ inch diameter for example, through the foam layer 20 and spaced apart along the length of the grooves 60a. The passages or grooves 60a have typical dimensions of ⅛ inch width and ⅛ inch depth and can be spaced apart 2 inches on center, or at greater or lesser distances, such as 4 inches on center for example only. The passages or grooves 60a and conduits 61 are machined, molded or otherwise formed in the intermediate layer 20. Other dimensions of the grooves 60a and holes 61 can be used, since the dimensions set forth above are offered only for purposes of illustration.

In an alternative embodiment of the invention, channel elements (not shown) having a similar channel configuration as channel 30a, but formed separately from the mold closure 30, can be placed beneath the mold closure 30 above the peel layer 23 to feed resin from ports 36 to the resin distribution passages or grooves 60a.

In still another alternative embodiment of the invention, the number of resin supply ports 36 can be increased and located on the mold closure 30 in positions effective to feed resin to the resin distribution passages or grooves 60a.

The mold closure 30 includes a plurality of collapsible resin supply ports 36 for introducing resin from a resin source or reservoir R1 into the mold cavity 12 via the aforementioned channels 30a. The resin is distributed via the aforementioned grooves 60a across the side surfaces of the reinforcement foam layer 20 throughout the reinforcement layers 22, 24.

In a particular embodiment of the invention, the resin supply ports 36 are identical and each includes a frusto-conical body 37 connected to the mold closure 30 or formed integrally therewith. Each port body 37 includes an outer tubular sleeve 37a, such as silicone, fluroelastomer or other rubber having a medium durometer value of 50 for example only, and an inner lower durometer rubber liner 37b. The inner liner 37b is made of a relative low durometer rubber, such as silcone rubber having a durometer value of 20 for example only, that imparts enough flexiblity to the liner 37b to allow the liner to collapse and seal in air-tight manner on a cured resin plug 80, FIG. 5B, formed at the port in a manner to be described.

The lower ends of both the outer sleeve 37a and the inner liner 37b are joined to the mold closure 30 by adhesive bonding or mechanical fastening to provide an air-tight sealed connection. An annular layer 71 comprised of the same material as closure 30 may be provided about each port 36 to reinforce the closure. The lower end of the inner liner 37b defines a lower resin entry opening 39a communicating the chamber C defined within the inner liner 37b to the mold cavity 12 when the mold closure 30 closes off the mold.

The space S between the outer sleeve 37a and inner liner 37b can be evacuated by opening a manual or electric solenoid valve 38 to communicate the space to a secondary vacuum pump V2 via a passage 37c provided through the outer sleeve 37a to this end. When a vacuum is present in the space S, the inner liner 37b is drawn to engage the outer sleeve 37a, FIG. 5A.

Figure 5A:
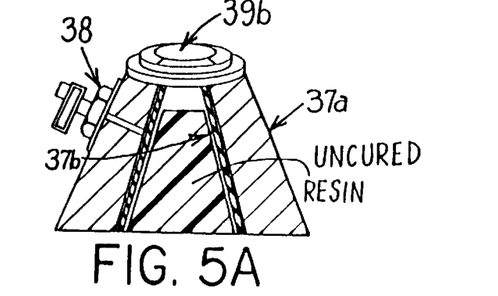
FIGS. 5A and 5B are cross-sectional views of an individual resin supply port including a collapsible inner liner prior to curing of the resin at the port (FIG. 5A) and after curing of the resin at the port (FIG. 5B).
Figure 5B:
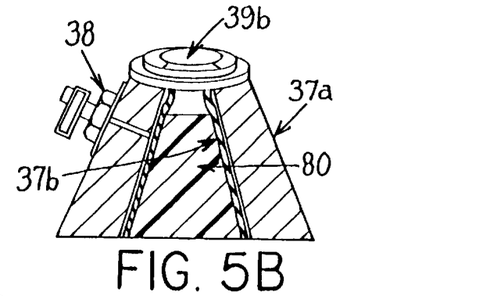
Figure 5C:
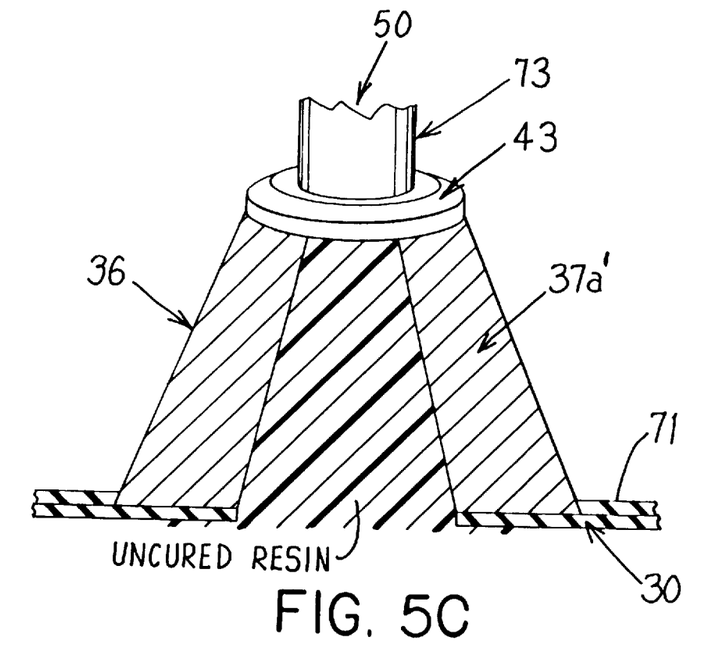
FIGS. 5C and 5D are cross-sectional views of an alternative collapsible resin supply port without the inner liner prior to curing of the resin at the port (FIG. 5C) and after curing of the resin at the port (FIG. 5D).
Figure 5D:
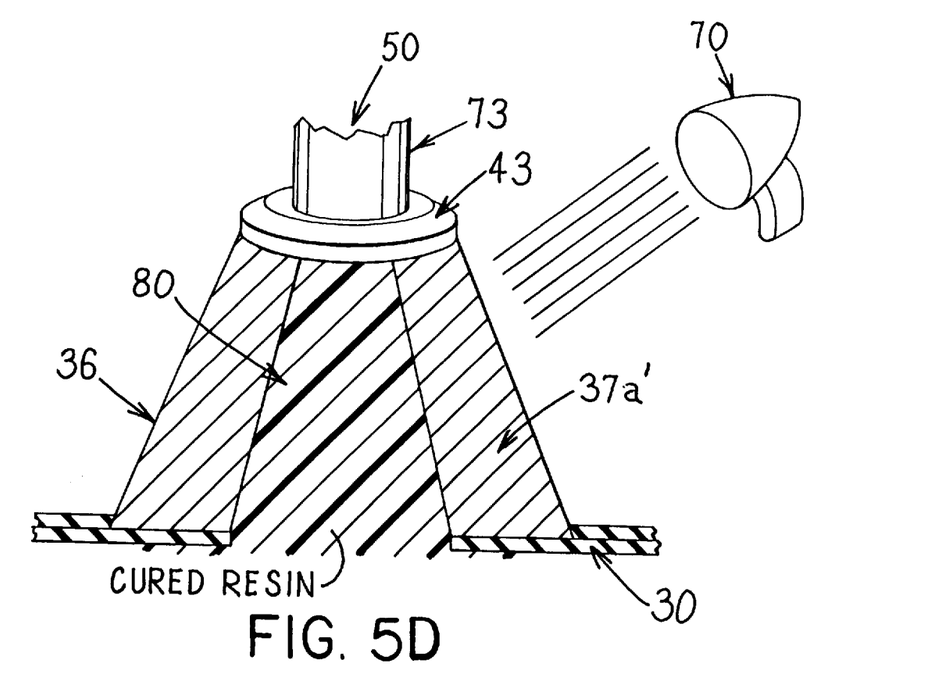

An alternative resin supply port 36 is shown in FIGS. 5C and 5D. The alternative resin supply port 36 includes only a main frusto-concial sleeve 37a' made of silicone rubber having a 50 durometer value for example only to render the resin supply port flexible and collapsible onto a cured resin plug 80 formed in-situ therein, FIG. 5D, to form an air-tight seal in cooperation therewith. The inner liner 37b of FIGS. 5A, 5B is omitted.

The mold closure 30 and resin supply ports 36 are not limited to the materials described in detail above and can be made of other flexible, transluscent materials with other Durometer values.

The upper ends of the outer sleeve 37a and liner 37b in FIG. 5A–5B or sleeve 37a' in FIGS. 5C–5D are/is sealably connected to a connector 42 itself sealed and communicated to a "T" fitting 44. The upper opening 39b of the chamber C of each port 36 is thereby communicated to each fitting 44.

The fitting 44 includes a manual or electric solenoid vent valve 46 that can be actuated to vent the resin supply conduit 50 to ambient or atmospheric pressure. The resin supply conduit 50 is sealably connected to the fitting 44 by adhesive bonding or mechanical fastening. The resin supply conduit 50 can comprise conventional plastic (e.g. polyethylene or polypropylene) tubing material having an inner diameter of ⅜ inch, although other tube materials and tube sizes can be used in practicing the invention.

Referring to FIG. 2, the resin supply conduits 50 extending from the resin supply ports 36 are connected to a resin manifold 56 on the frame 31. The resin manifold 56 in turn is communicated to a central, common resin supply tube 52. The resin supply tube 52 is releasably connected to the resin manifold by a self-air tight sealing quick disconnect fitting connection 54 so that the resin supply tube 52 can be easily disconnected from the resin manifold 56 and thus the resin supply conduits 50. The ends of the resin supply conduits 50 are held in position on the resin manifold 56 after disconnection of the resin supply tube 52. The resin supply tube 52 can comprise plastic (e.g. polyethylene or polypropylene) tubing material having an inner diameter of 2 inches, although other tube materials and tube sizes can be used in practicing the invention.

Although four resin supply ports 36 and resin supply conduits 50 are illustrated in FIG. 2, fewer or greater numbers can be used. Typically, a larger number of resin supply ports 36 and resin supply conduits 50, such as 4 to 50, are present, the number being used being dependent on the size and shape of the composite structure to be formed.

The central, common resin supply tube 52 is communicated to a reservoir R1 supplied with resin by pump P.

Pump P is a conventional mixing pump that draws the resin from reservoir R to the pump head H where the resin is mixed with appropriate resin additives such as thermal initiators and promoters described below and UV initiators, if not present in the resin already. The resin with additives is stored in a secondary reservoir R1 having a resin level control float valve F and from which reservoir R1 the resin with additives is forced by atmospheric pressure through the resin supply tube 52 and tubes 50 into the mold cavity 12 when the mold cavity is evacuated.

The resin in reservoir R1 may be comprised of an ultraviolet (UV) and heat curable co-catalyzed epoxy-vinylester type of liquid resin. A UV catalyzed resin available commercially under the trademark SunRez can be present in reservoir R and mixed in pump head H with resin additives including one or more thermal curing initiators and a promoter. A resin composition in reservoir R1 for injection into the mold 10 comprises the aforementioned UV catalyzed Sunrez resin including 0.4 weight % Percadox 16 and 0.4 weight % Esperox 570P commercially available thermal initiators and 0.1 weight % commercially available 6% cobalt napthalate promoter mixed with the UV catalyzed resin at pump head H. This resin composition will cure (harden) in response to exposure to ultraviolet radiation and heat to form a solid, hard polymeric material. However, at room temperature, this resin composition will remain uncured available for injection for up to approximately 8–12 hours such that the resin returned from supply conduits 50 and supply tube 52 to reservoir R1 can be reused within that time. The present invention is not limited to any particular resin however and can be practiced using other resins such as epoxy.

Associated with each resin supply port 36 is an ultraviolet lamp 70 for selectively curing the resin in each resin supply port 36. The lamps 70 (only one shown) are positioned on the mold closure 30 or associated frame to direct ultaviolet radiation at the frusto-concial resin supply port 36, which is transparent to ultraviolet radiation by virtue of the rubber used. Alternatively, a thermal heat source (not shown) such as a heat gun or blower or electrical resistance wires (not shown) can be operably associated with each port 36 to selectively heat and cure the resin in each port.

The surfaces of the resin supply conduits 50 proximate enough to the ports 36 to be exposed to the ultraviolet radiation from the lamps 70 include an ultraviolet radiation barrier 73, such as black paint, to prevent curing of the resin in the conduits 50.

In practicing a method embodiment of the present invention, the reinforcement 14 is positioned (laid up) in the mold cavity 12 of the mold 10 in conventional manner. The mold closure 30 is lowered by the pulley system 32 and support bar 34 to a position on the mold 10 illustrated in FIG. 3. The clamp or latch mechanism 40 is manually actuated by positioning the slide-away braces 45 to engage the associated frame rails 33 and fastening (threading) the pins 47 in the mold 10 to effect an air-tight seal between the mold 10 and mold closure 30, FIG. 3.

The mold cavity 12 is evacuated via a main vacuum conduit VC connected by a self-air tight sealing quick release fitting connection (not shown) to one or more bottom openings VO in the mold cavity communicated to a main vacuum pump V1. Typically, the mold cavity 12 is evacuated to a level of greater than or equal to 28 inches-Hg. The reinforcement 14 typically is compressed in thickness by 15% for example only by such a level of vacuum in the mold cavity 12 as a result of ambient atmospheric pressure on the exterior side of the mold closure 30.

The ultraviolet and heat curable resin is forced by atmospheric pressure on the resevoir R1 through the central, common resin supply tube 52 and open valve VVV in supply tube 52 to the resin supply conduits 50 connected to the resin supply ports 36. The resin is fed from the grooves 30b to the resin distribution grooves 60a across the inner reinforcment layer 20 to infuse the outer reinforcement layers 22, 24 with the resin.

In FIG. 5A, valve 38 is actuated during pumping of the resin into the mold cavity 12 in order to draw the inner liner 37b against the inner surface of the outer body 37a of each resin supply port 36. In FIG. 5C, the inner liner 37b is ommited such that there is no need for this step.

After the reinforcement 14 is satisfactorily infused with resin, the ultraviolet lamps 70 are turned on to selectively direct ultraviolet radiation at each resin supply port 36 to cure the resin therein to form a solid cured resin plug 80. In FIG. 5A, as the resin cures at the ports 36 and when the vacuum at valve 38 is released (providing ambent pressure at passage 37c), the inner liners 37b at the ports 36 collapse onto the hardened plugs 80 to create an air-tight (vacuum-tight) seal in cooperation with the plugs 80, FIG. 5B.

In FIG. 5C, as the resin cures at the resin supply ports 36 with ambient pressure on the exterior of the sleeves 37a', the sleeves 37a' collapse onto the hardened plugs 80 to form an air-tight (vacuum-tight) seal in cooperation with the plugs 80, FIG. 5D.

The ultraviolet radiation barriers 73 disposed about the resin supply conduits 50 prevent curing of the resin in the conduits 50 during the plug forming step.

After the air-tight seals are formed at the resin supply ports 36, the vent valves 46 are opened at the fittings 44 to vent the resin-filled supply conduits 50 to ambient atmosphere at locations upstream (upstream relative to resin flow) of and proximate to the plugs 80, FIG. 3. Then, a relative vacuum is established in the central, common resin supply tube 52 by opening a normally closed valve V (closed during resin injection) to a vacuum pump V3, FIG. 2, connected to tube 52 via polyethylene or polypropylene plastic tubing so that a vacuum is established in the tube 52 at a level sufficient to draw the uncured reusable resin residing in the resin supply conduits 50 and tube 52 into a vacuum sealed tank T. Valve VV between tank T and reservoir R1 is closed, while normally open valve VVV (open during resin injection) in supply tube 52 is closed to isolate the reservoir R1 during evacuation of supply tube 52. The resin drawn into tank T is returned to the reservoir R1 via a resin return conduit or line RT as indicated by the arrow in FIG. 2 by gravity feeding or pumping the resin from tank T to reservoir R1 with normally closed valve VV in return line RT opened and with the vacuum in the tank T released or vented to atmosphere by valve VEV to provide ambient pressure therein. The resin can be reused within a time period that it remains uncured (e.g. up to 8–12 hours for the particular resin composition described in detail above) in making the next composite component.

The central, common resin supply tube 52 is released from the resin supply conduits 50 and manifold 56 by disconnecting or releasing the self-sealing quick disconnect fitting connection 54. The connection 54 then is capped by a conventional quick disconnect vacuum tight resilent cap 55. The vacuum conduit VC is disconnected from the mold by disconnecting or releasing a similar self-sealing quick disconnect fitting connection (not shown) at the mold bottom.

Figure 6:
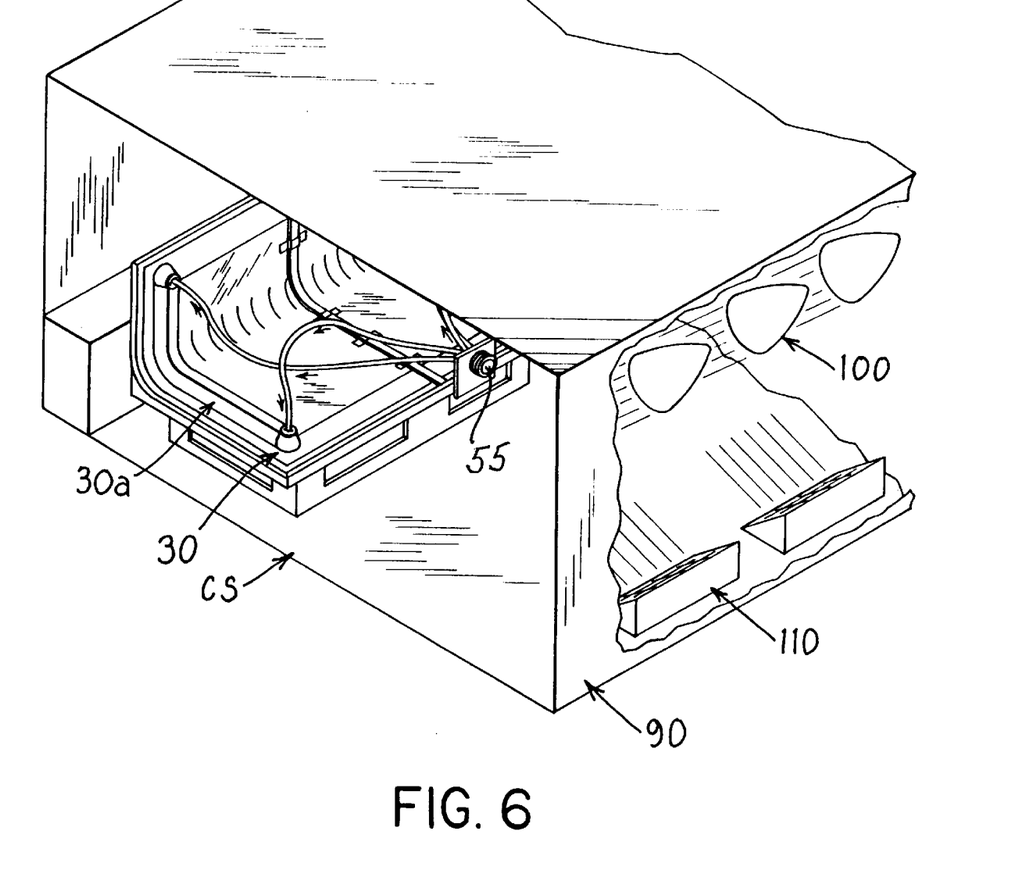
FIG. 6 is a schematic view of a curing station for curing resin in the mold.

The assembly of mold/base 10,11 and mold closure 30 with the resin infused reinforcement 14 therein then is moved to a curing station CS shown in FIG. 6, where a vacuum of greater than or equal to 28 inches-Hg is maintained in the mold cavity 12 by connecting another vacuum conduit (not shown but similar to conduit VC) to the aforementioned quick release fitting connection at the mold bottom, the vacuum conduit in turn being connected to a vacuum pump (not shown) located proximate the curing station CS. The curing station CS comprises an oven 90 having ultraviolet lamps 100 positioned adjacent the mold closure 30. The lamps 100 direct ultraviolet radiation through the mold closure 30 to cure the side of the resin infused reinforcement proximate the mold closure. The oven 90 also include heaters 110, such as convective type of heaters, to heat the bottom of the mold 10. Heat from the bottom of the mold 10 cures the resin infused reinforcement proximate the bottom of the mold. The resin is thereby cured on opposite sides of the foam layer in the mold cavity 12 to form a reinforced composite structure in the mold cavity.

An alternative embodiment of the invention envisions mold 10 being heated integrally using electrical resistance wiring or fluid heating (e.g. heating water) incorporated on the mold 10 to cure the resin in conjunction with an ultraviolet transparent mold 10.

After the resin is cured, the assembly of mold/base 10,11 and mold closure 30 with the cured resin infused reinforcement therein is moved out of the oven 90. The vacuum in mold cavity 12 is released by opening the closure 30 or otherwise opening the mold cavity 12 to atmosphere. The clamp mechanism 40 is released to enable the mold closure 30 to be quickly and easily removed. The reinforced composite structure then can be removed from the mold cavity 12. The mold closure 30 as well as the resin supply conduits 50 and tube 52, empty of resin, are available for reuse in the manufacture of additional composite structures in the manner described above.

Figure 7:
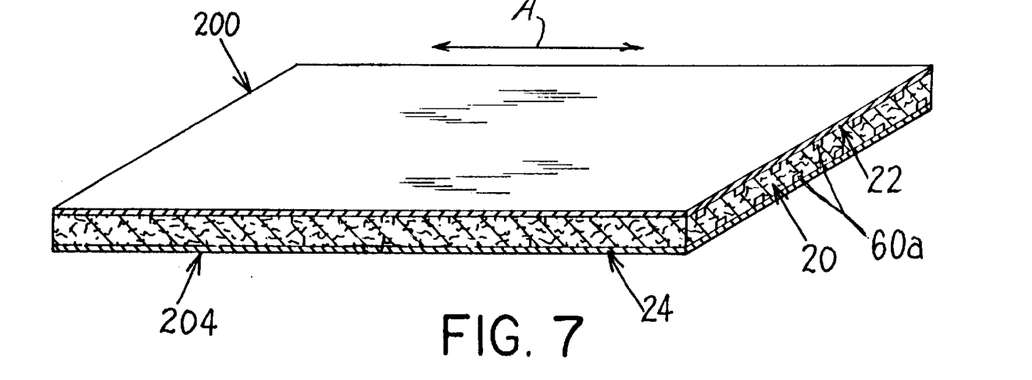
FIG. 7 is a perspective view of the reinforced composite structure.

FIG. 7 illustrates the reinforced composite structure removed from the mold 10 after curing and after removal of peel layer 23. The composite structure comprises an outer cured resin side 200. The side 200 is free of any raised resin ribs formed in the channels 30a. In particular, removal of the peel layer 23 also removes the raised resin ribs formed in channels 30a. The opposite side 204 of the composite structure has a net shape surface configuration. The resin distribution grooves 60a filled with resin are shown on the opposite sides of the foam layer 20 in FIG. 7.

Figure 8:
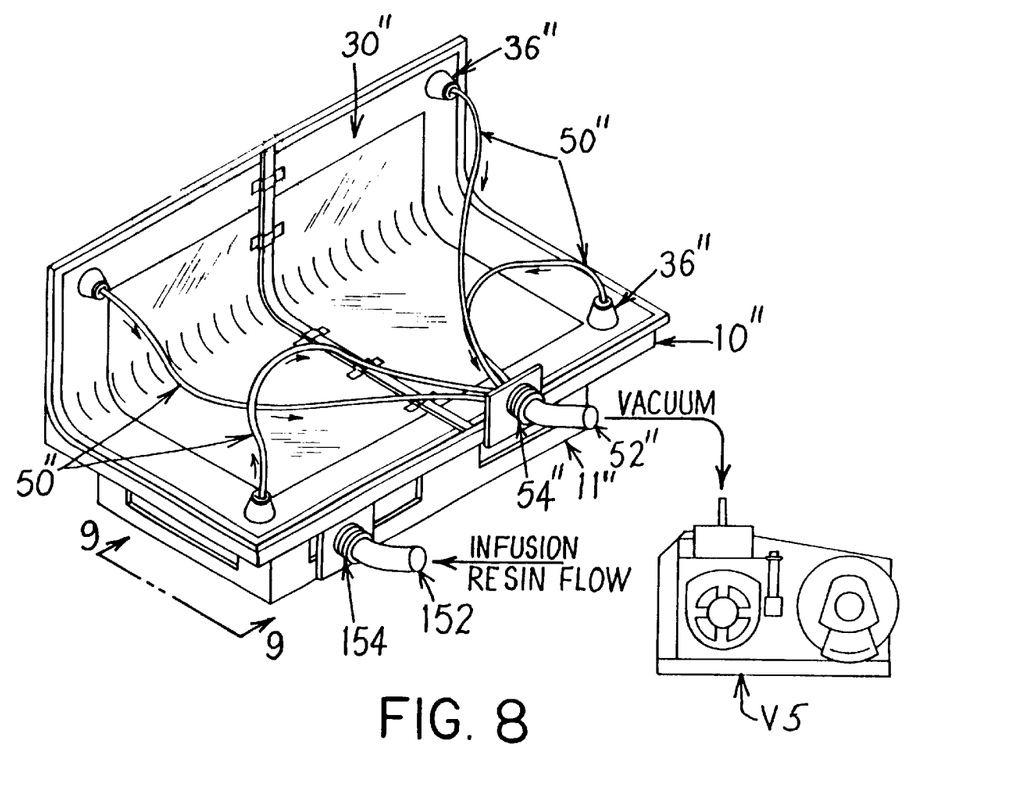
FIG. 8 is a perspective view of the apparatus in accordance with another embodiment of the invention showing a mold closure positioned on a modified female mold.
Figure 9:
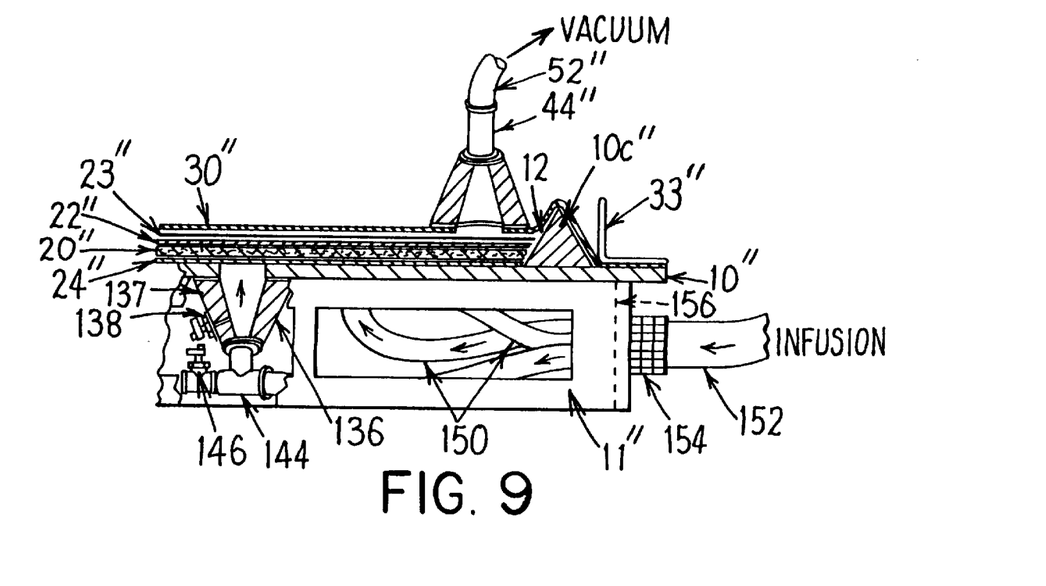
FIG. 9 is a partial cross-sectional view of the apparatus of FIG. 8 showing bottom resin supply lines.

Referring to FIGS. 8 and 9, an alternative embodiment of the invention is illustrated where like features of FIG. 1–6 are designated by like reference numerals double primed. This embodiment differs from that shown in FIGS. 1–6 in that a plurality of resin supply ports 136 (only one shown) are disposed on the bottom of the female mold 10" and connected to a central, common resin supply tube 152 via individual resin supply conduits 150. The resin supply ports 136 can be constructed in the manner shown in FIGS. 5A, 5B or 5C, 5D. The resin supply ports 136 communicate to grooves in the reinforcement layer 20" (grooves not shown but like grooves 60a) in the manner described above as well as channels (not shown but like channels 30a) or as separate channel elements between the mold bottom and the reinforcement layer 24". Although not shown, an ultraviolet lamp is associated with each resin supply port 136 to cure the resin at the ports 136 in the manner described above. This method may be used in conjunction with the former described embodiment to form various hybrid resin infusion techniques.

The mold closure 30" is similar to that described above. However, the ports 36", conduits 50" and tube 52" are connected to a vacuum pump V5 in this embodiment of the invention such that the mold closure 30" functions as a vacuum intensifier, rather than as a resin infusion medium to distribute resin across the reinforcement 14".

After resin has been introduced to the mold cavity 12" to satisfactorily infuse the reinforcement 14", the ultraviolet lamps (not shown) on the bottom of the mold 10" are turned on to direct ultraviolet radiation at each resin supply port 136 to cure the resin therein to form a cured solid resin plug (not shown but see FIG. 5B and 5D). The resin supply ports 136 collapse on the plugs to form air-tight (vacuum-tight) seals as described above.

Ultraviolet radiation barriers (not shown but similar to barriers 73 described above) disposed on the resin supply conduits 150 prevent curing of the resin in the conduits 150 during the plug forming step.

After the air-tight seals are formed at the resin supply ports 136, the vent valves 146 (only one shown) are opened at the fittings 144 to vent the resin-filled supply conduits 150 to ambient atmosphere at locations upstream (upstream relative to resin flow) of the plugs. Then, a relative vacuum is established in the central, common resin supply tube 152 by a vacuum pump (not shown) connected to the tube 152 as described above. The vacuum in the tube 152 draws the uncured resin in the resin supply conduits 150 and tube 152 back into the tank T for return to reservoir R1 (not shown but see FIG. 2) for reuse.

The central, common resin supply tube 152 is released from the resin manifold 156 and resin supply conduits 150 by disconnecting the connection 154. The connection 154 then is capped as described above.

The assembly of mold/base 10",11" and mold closure 30" with the resin infused reinforcement therein is moved to the curing station CS shown in FIG. 6 where the resin infused reinforcement is cured to form a reinforced composite structure in the mold cavity in the manner described above.

While the invention has been described in terms of specific embodiments thereof for illustration purposes, it is not intended to be limited thereto but rather only to the extent set forth hereafter in the following claims.

We claim:

1. A method of making a reinforced composite structure, comprising:
    a) introducing resin to resin supply port means communicated to a mold to infuse a reinforcement in the mold with the resin,
    b) selectively curing the resin at said resin supply port means to form cured resin plugs with which said port means cooperate to provide an air-tight seal thereat, including avoiding curing of the resin infused in said reinforcement in said mold,
    c) disconnecting the resin supply port means from communication with the resin source, and
    d) then curing the resin infused in said reinforcement in said mold to form a reinforced composite structure in said mold.

2. The method of claim 1 wherein an ultraviolet and/or heat curable resin is introduced into the mold cavity and is selectively cured in step b) at said resin supply port means by exposure to ultraviolet radiation and/or heat at said ports.

3. The method of claim 2 wherein the resin is selectively cured at said resin supply port means in step b) with in said mold under vacuum such that said resin supply port means are collapsed onto the cured resin plugs to seal thereon to effect said air-tight seal.

4. The method of claim 2 wherein curing of the resin infused in said reinforcement in said mold is avoided in step b) by applying ultraviolet radiation and/or heat only to resin in said resin supply port means.

5. The method of claim 1 including disconnecting the resin supply port means from the resin source by disconnecting a resin supply tube disposed between the resin source and resin supply conduits in communication with said mold.

6. The method of claim 1 including after step c) and prior to step d), moving the mold with the resin infused reinforcement therein to a curing station where the resin infused in the reinforcment is cured under vacuum in said mold.

7. The method of claim 6 wherein the resin infused in said reinforcement is cured at the curing station by ultraviolet radiation directed through a mold closure member at one side of said mold and by heating an opposite side of said mold.

8. A method of making a reinforced composite structure, comprising:
   a) positioning a reinforcement in a mold cavity of a mold,
   b) disposing a reusable mold closure to close off said mold cavity with said reinforcement therein, said mold closure having a plurality of collapsible resin supply ports for introducing resin in said mold cavity,
   c) communicating said mold cavity to a source of resin via said resin supply ports,
   d) introducing resin through the resin supply ports and into the mold cavity to infuse said reinforcement with the resin,
   e) selectively curing the resin at said resin supply ports to form cured resin plugs on which the resin supply ports collapse to provide an air-tight seal thereat, including avoiding curing of the resin infused in said reinforcement in said mold, and
   f) then curing the resin infused in said reinforcement in said mold to form a reinforced composite structure in said mold.

9. The method of claim 8 wherein an ultraviolet and/or heat curable resin is introduced into the mold cavity and is selectively cured in step e) at said resin supply ports by exposure to ultraviolet radiation and/or heat at said ports.

10. The method of claim 9 wherein curing of the resin infused in said reinforcement in said mold is avoided in step e) by applying ultraviolet radiation and/or heat only to resin in said resin supply ports.

11. The method of claim 8 including after step e) and prior to step f), moving the mold and mold closure with the resin infused reinforcement therein to a curing station where the resin infused in the reinforcment is cured under vacuum in said mold.

12. The method of claim 11 wherein the resin infused in said reinforcement is cured at the curing station by ultraviolet radiation directed through said mold closure at one side of said mold and by heating an opposite side of said mold.

13. The method of claim 8 including communicating each of said resin supply ports to a respective one of resin supply conduits communicated to said resin source.

14. The method of claim 13 including in step e) avoiding curing of the resin in said resin supply conduits.

15. The method of claim 14 wherein uncured resin residing upstream of said plugs in said resin supply conduits is removed after said cured resin plugs are formed at said ports.

16. The method of claim 15 wherein the uncured resin residing in said resin supply conduits is removed by venting said resin supply conduits to ambient proximate said plugs and drawing a vacuum in said resin supply conduits.

17. The method of claim 16 wherein said resin supply conduits are disconnected from a resin supply tube after said resin is removed therefrom.

* * * * *